(12) United States Patent
Puccio et al.

(10) Patent No.: US 10,001,216 B2
(45) Date of Patent: Jun. 19, 2018

(54) METAL END CAP SEAL

(71) Applicant: Cameron International Corporation, Houston, TX (US)

(72) Inventors: William Puccio, Katy, TX (US); Shian Jiun Chou, Fountain Valley, CA (US); David Cain, Katy, TX (US)

(73) Assignee: Cameron International Corporation, Houston, TX (US)

(*) Notice: Subject to any disclaimer, the term of this patent is extended or adjusted under 35 U.S.C. 154(b) by 0 days. days.

(21) Appl. No.: 15/084,281

(22) Filed: Mar. 29, 2016

(65) Prior Publication Data

US 2016/0298767 A1     Oct. 13, 2016

Related U.S. Application Data

(60) Provisional application No. 62/144,240, filed on Apr. 7, 2015.

(51) Int. Cl.
*F16J 15/12* (2006.01)
*E21B 33/06* (2006.01)
*E21B 33/04* (2006.01)

(52) U.S. Cl.
CPC ............. *F16J 15/128* (2013.01); *E21B 33/04* (2013.01); *E21B 33/06* (2013.01)

(58) Field of Classification Search
CPC .......... F16J 15/128; F16J 15/12; F16J 15/121; E21B 33/04; E21B 33/06; B29C 43/18
See application file for complete search history.

(56) References Cited

U.S. PATENT DOCUMENTS

| | | | | |
|---|---|---|---|---|
| 2,249,127 A | * | 7/1941 | Goetze | F16J 15/12 210/450 |
| 3,829,062 A | * | 8/1974 | Fend | F16J 15/12 251/332 |
| 3,869,132 A | * | 3/1975 | Taylor | F16J 15/002 277/608 |
| 2003/0209857 A1 | | 11/2003 | Keene | |
| 2003/0209862 A1 | | 11/2003 | Keene et al. | |
| 2005/0062235 A1 | * | 3/2005 | Keene | E21B 33/03 277/603 |
| 2011/0174506 A1 | * | 7/2011 | Duong | E21B 33/03 166/387 |
| 2011/0266752 A1 | | 11/2011 | Kocurek et al. | |
| 2012/0248703 A1 | | 10/2012 | Kocurek | |
| 2013/0106066 A1 | * | 5/2013 | Sarawate | F16J 15/128 277/641 |
| 2013/0207312 A1 | | 8/2013 | Hench et al. | |

(Continued)

OTHER PUBLICATIONS

International Search Report and Written Opinion of PCT Application No. PCT/US2016/024771 dated Jul. 4, 2016: pp. 1-15.

*Primary Examiner* — Eugene G Byrd
(74) *Attorney, Agent, or Firm* — Helene Raybaud

(57) ABSTRACT

A metal end cap seal for sealing against resent invention relates to seals within a fluid system. The metal end caps of the seal include protrusions or nibs on the terminal ends of the caps, providing for reduced friction during installation and use. The seal may also include a base elastomer and an insert elastomer, the base elastomer and insert elastomer having different material properties from one another. The insert elastomer is selected to reduce friction with a sealing surface.

21 Claims, 5 Drawing Sheets

(56) References Cited

U.S. PATENT DOCUMENTS

2014/0117629 A1\* 5/2014 Biallas .................... C23C 14/20
  277/653
2014/0203516 A1\* 7/2014 Kocurek ................. E21B 33/03
  277/399

\* cited by examiner

METAL END CAP SEAL

BACKGROUND

This section is intended to introduce the reader to various aspects of art that may be related to various aspects of the presently described embodiments. This discussion is believed to be helpful in providing the reader with background information to facilitate a better understanding of the various aspects of the present embodiments. Accordingly, it should be understood that these statements are to be read in this light, and not as admissions of prior art.

The present invention relates to seals within a fluid system. More specifically, the present invention relates to a metal end cap sealing assembly suitable for use in the harsh environments encountered by mineral extraction systems, for example. The metal end caps include protrusions or nibs on the terminal ends of the caps, providing for reduced friction during installation and use. The seal may also include a base elastomer and an insert elastomer, the insert elastomer being selected to reduce friction with a sealing surface.

Fluid systems, such as mineral extraction systems (e.g., oil and gas) and transport systems, typically include multiple segments of tubing, valves and connectors that are sealed together by various seals. These seals are often subjected to harsh environmental conditions, such as corrosive fluids, extreme pressures and extreme temperatures. Moreover, seals are often disposed in remote equipment, such as a marine (e.g., subsea) wellhead, which can make access and repair difficult and expensive. In mineral extraction applications, seals are typically constructed of a metal and/or an elastomer.

Metal seals provide long-term resistance to well bore fluids, temperatures and pressures, but often rely on high installation forces and complicated design and geometry to provide reliable sealing.

Elastomeric seals typically have a simple design that can be installed with low installation forces. Further, elastomeric seals may provide a seal across imperfections (e.g., damage, concentricity and ovalities) on sealing surfaces, and have larger manufacturing tolerances, concentricity and ovalities allowances. Elastomeric seals are generally formed from an elastomer base that is designed for use in a particular environment.

Some sealing applications may include a series of movements during operational life which become significant in terms of continued performance. Continued performance includes sealing without failure. The challenge for a seal system which must constantly survive the accumulative damage, wear or any other unwanted effects due to a series of movements during operational life is to include the required features which mitigated accumulative effects below the range where they become significant. The subject invention addresses mitigation of unwanted effects. The subject invention further includes full metallic sealing.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a detailed description of the preferred embodiments of the invention, reference will now be made to the accompanying drawings in which.

DETAILED DESCRIPTION

Figure 1:
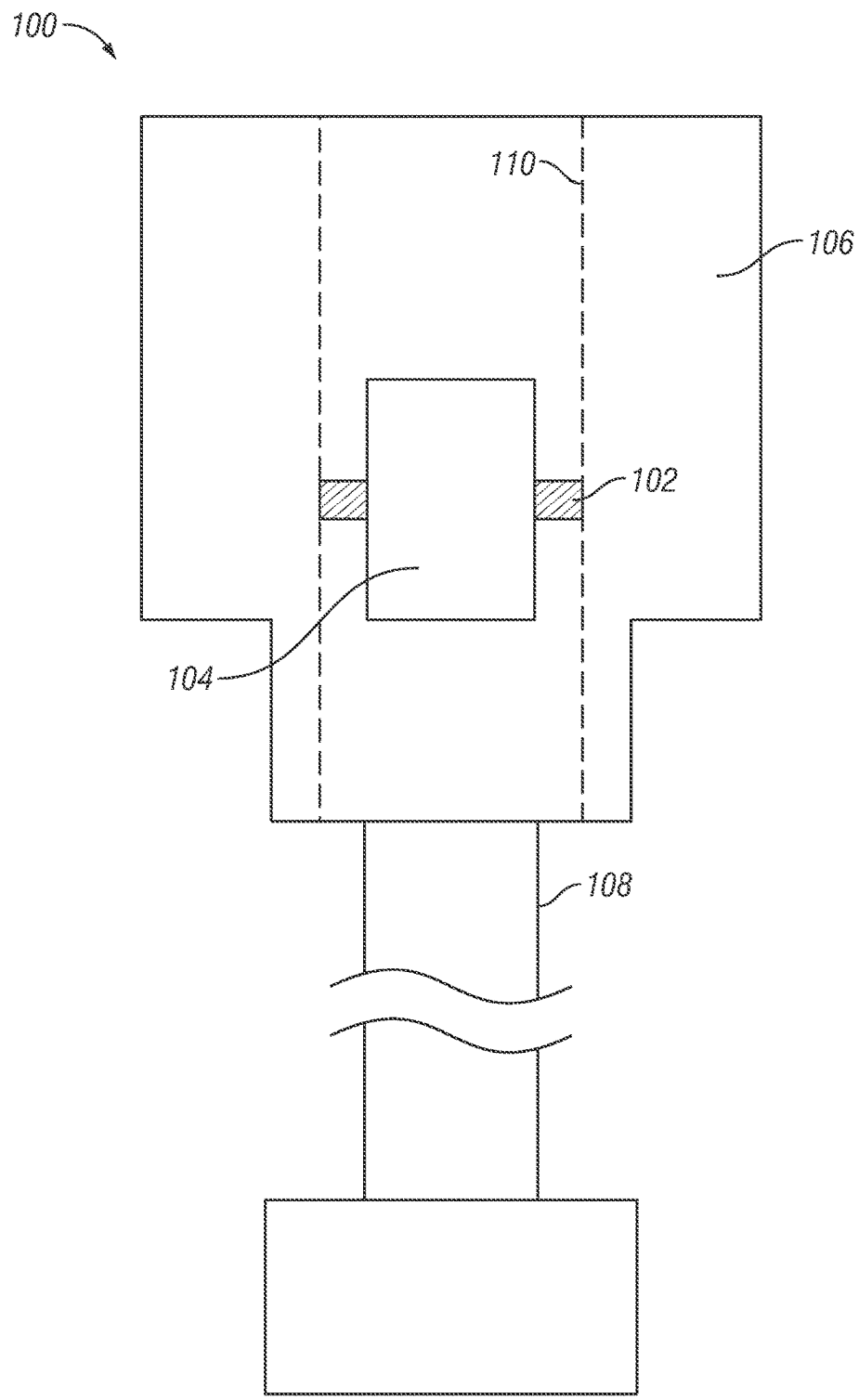
FIG. 1 is a schematic illustration of a metal end cap seal disposed in a fluid system.

The following discussion is directed to various embodiments of the invention. The drawing figures are not necessarily to scale. Certain features of the embodiments may be shown exaggerated in scale or in somewhat schematic form and some details of conventional elements may not be shown in the interest of clarity and conciseness. Although one or more of these embodiments may be preferred, the embodiments disclosed should not be interpreted, or otherwise used, as limiting the scope of the disclosure, including the claims. It is to be fully recognized that the different teachings of the embodiments discussed below may be employed separately or in any suitable combination to produce the desired results. In addition, one skilled in the art will understand that the following description has broad application, and the discussion of any embodiment is meant only to be exemplary of that embodiment, and not intended to intimate that the scope of the disclosure, including the claims, is limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices, components, and connections. In addition, as used herein, the terms "axial" and "axially" generally mean along or parallel to a central axis (e.g., central axis of a body or a port), while the terms "radial" and "radially" generally mean perpendicular to the central axis. For instance, an axial distance refers to a distance measured along or parallel to the central axis, and a radial distance means a distance measured perpendicular to the central axis.

FIG. 1 is a partial cross-sectional view of an embodiment of a fluid system 100 having one or more seals 102 between an inner body 104 and an outer body 106. In certain embodiments, the fluid system 100 includes a mineral extraction system for the extraction of subterranean natural resources, such as oil and gas. For example, in the illustrated embodiment, the outer body 106 includes a wellhead coupled to a formation by way of, for instance, a production string 108. The inner body 104 may include a hanger disposed in a wellhead bore 110 and may be supported by the wellhead, for example. It will be appreciated that in the case of mineral extraction systems, the inner and outer bodies 104 and 106 may include any number of components, such as christmas/production trees, casing hangers, casing heads, casing strings, tubing hangers, tubing heads, tubing strings, running tools, blowout preventers, valves, flanges, and the like.

In mineral extraction and similar systems, the seal 102 may be used with working pressures including 20,000 pounds per square inch (psi). In other words, in certain embodiments, the seal 102 may be used to isolate regions of gasses or fluids with pressure differentials across the seal 102 of 15,000 psi or greater. Further, the operating environment of such systems may include temperatures ranging from −50° F. to 350° F.

As discussed in further detail below, embodiments of the seal 102 can include a plurality of elastomers. For example, the seal 102 may include different portions made of different elastomers having different characteristics, such as stiffness, chemical resistance, behavior as a function of temperature, and so forth. In some embodiments, the plurality of elastomers may be formed into a single body. The illustrated seal 102 may include a combination of elastomers formed into a homogeneous body (e.g., single common, solid body).

In certain embodiments, a base elastomer may include a harder material and an insert elastomer may include a relatively soft material, or vice-versa. The harder base elastomer possesses properties that are conducive to sealing in high-pressure and high-temperature environments, and the insert elastomer possesses properties that are conducive to sealing in high-pressure and low-temperature environments. Accordingly, in certain embodiments, the outer elastomer is used for sealing, protecting, and isolating the inner elastomer from high-pressure media in high-temperature environments, and the inner elastomer is used for sealing at high temperatures and/or when the environmental temperatures are below effective sealing temperatures of the outer elastomer. In other words, the seal 102 includes a first material or property that is effective to seal mutually exclusively without the second material or property in certain conditions, while the second material or property is effective to seal mutually exclusively without the first material or property in other conditions. Thus, the embodiments of the seal 102 described in detail below are particularly well suited for use in a wide range of temperatures (e.g., high and low temperatures) and chemical environments.

Figure 2:
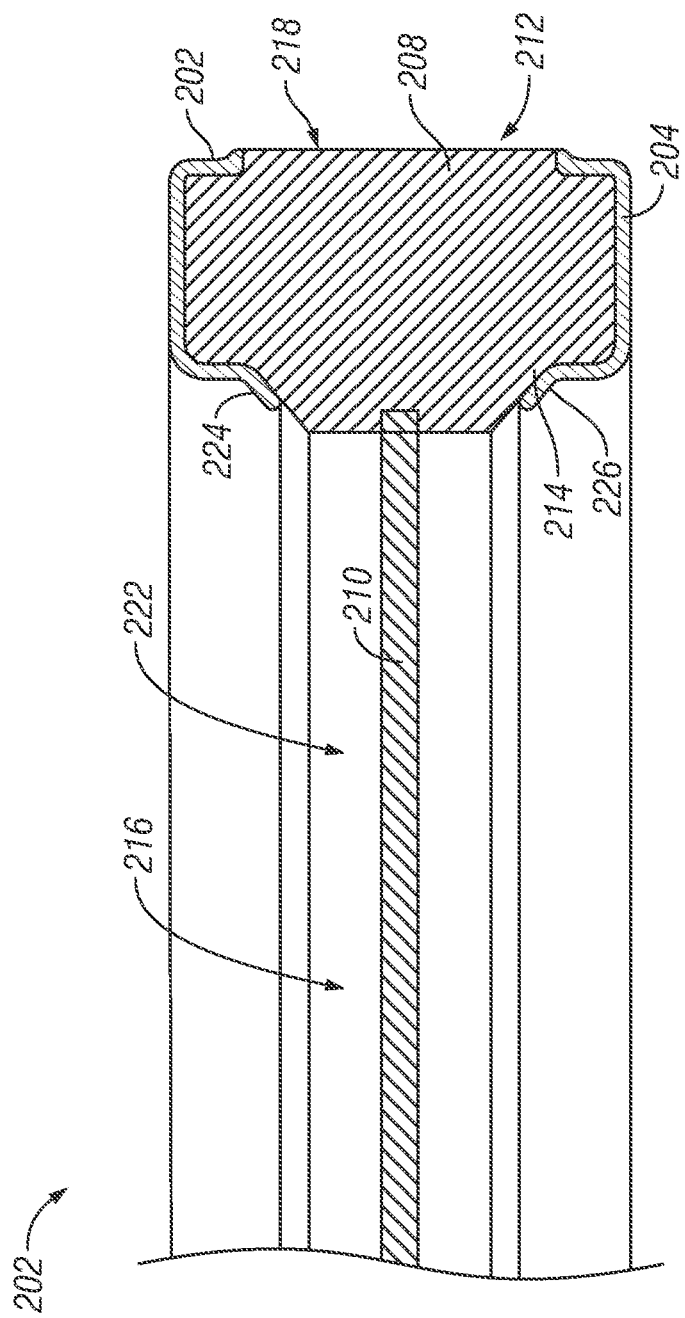
FIG. 2 is a cross-sectional elevation view of a metal end cap seal.

FIG. 2 illustrates a partial cross-section of a metal end cap seal 202 in accordance with embodiments of the present invention. The seal 102 includes a seal body 212 which includes an inner seal surface 216 on the inner face of the seal 102 and an outer seal surface 218 on the outer face of the seal body 212. The illustrated embodiment shows the inner seal surface 216 having chamfered edges 214 and an elastomeric protrusion 222, and the outer seal surface 218 being generally linear. The seal 102 further includes an upper metal end cap 202 disposed on the top face of the seal 102 and a lower metal end cap 204 disposed at the bottom face of the seal 102. The upper and lower metal end caps 202 and 204 span the upper and lower faces of the seal body 212, respectively. The upper and lower metal end caps 202 and 204 terminate on the inner and outer surfaces of the seal body 212. The terminal ends of the upper and lower metal end caps 202 and 204 on the inner seal surface include upper and lower protrusions or nibs 224 and 226, respectively. The protrusions 224 provide for lower friction insertion of the seal into an assembly as compared to the friction generated when inserting a metal end cap seal lacking protrusions.

The metal end caps 202 and 204 of the seal 102 may be constructed of materials known to mitigate wear, such as wear related to frictional forces. For instance, the metal end caps 202 and 204 can be constructed from nickel based alloys, copper alloys which are beryllium free, copper beryllium alloys and others. These materials have lower friction resulting in lower wear rates during movement and therefore mitigate the accumulation of undesired damage.

The seal body 212 includes a base portion 208 and one or more integral insert portions 210. For example, the seal body 212 includes the base portion 208 having a generally rectangular shape (e.g., cross-sectional profile) including one or more chamfered edges 214 and an insert portion 210. The base portion 208 can be made from materials including elastomers. Those of ordinary skill in the art appreciate that elastomers (e.g., rubbers), have generally low Young's modulus and high failure strain compared to other polymers. The lower modulus allows the seal 102 to be more compliant with and less sensitive to mating sealing surface defects which might cause leaks.

The insert portion 210 is made from a dual durometer type lower friction polymer integral to the overall seal body 212. The insert portion 210 can be in contact with a moving mating sealing surface, as illustrated in FIG. 4 and discussed below. Use of lower friction materials results in lower seal wear and mitigates unwanted wear, which could lead to leaks across the seal.

Figure 3:
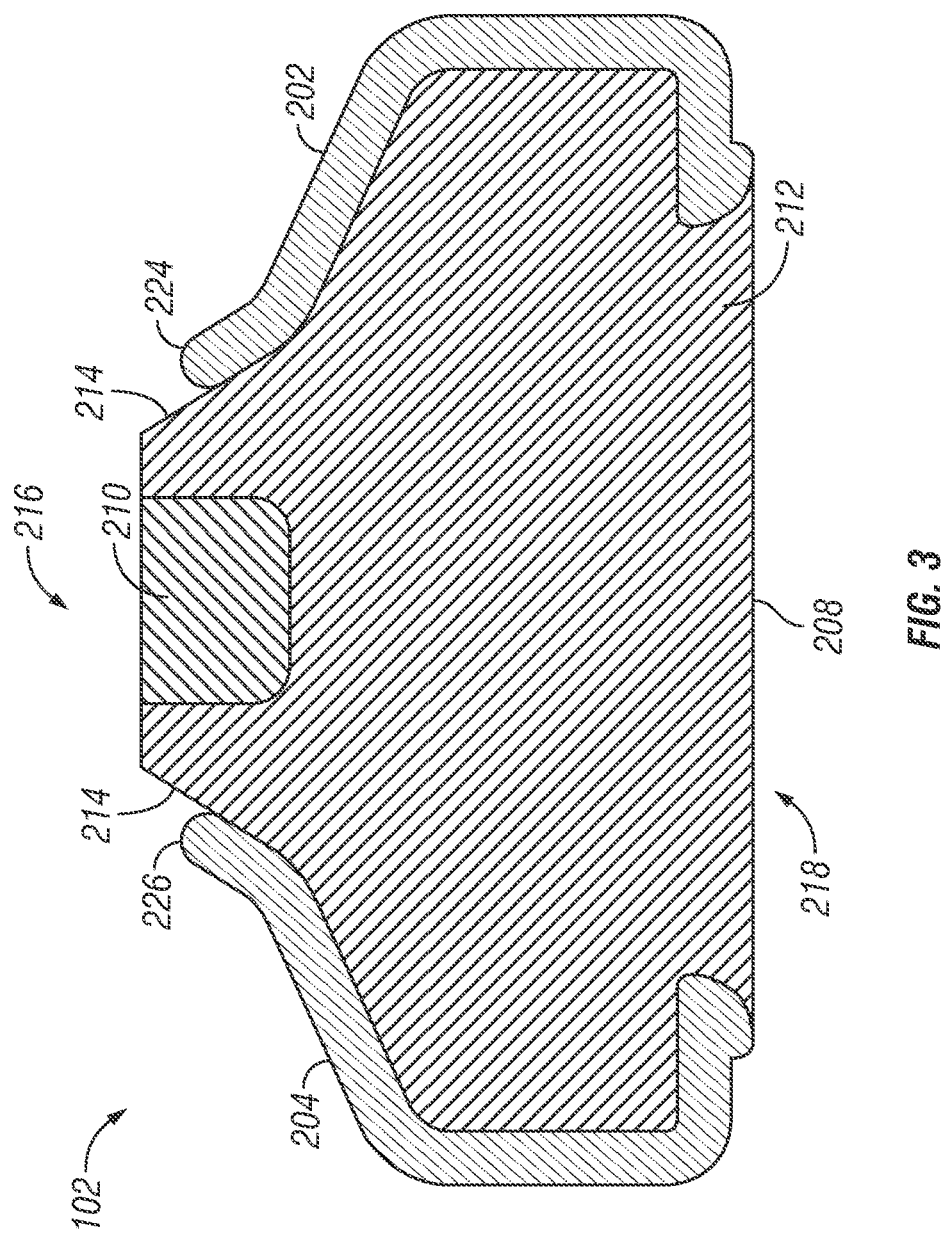
FIG. 3 is a cross-sectional profile view of a metal end cap seal.
Figure 4A:
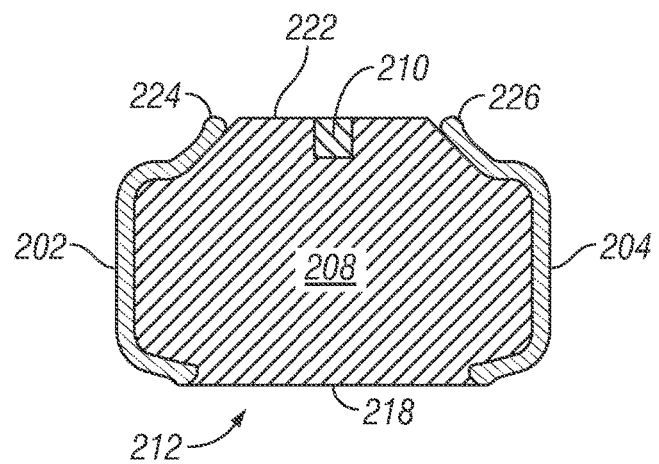
FIG. 4A is a cross-sectional profile view of a metal end cap seal in an uncompressed state.

FIGS. 3 and 4A illustrate a cross-section of a profile view of the embodiment of the seal illustrated in FIG. 2 in an uncompressed state. The seal body 212 includes the inner seal surface 216 on the inner face of the seal 102 and the outer seal surface 218 on the outer face of the seal body 212. The illustrated embodiment shows the inner seal surface 216 having chamfered edges 214 and an elastomeric protrusion 222 and the outer seal surface 218 being generally linear. The seal 102 further includes an upper metal end cap 202 disposed on the top face of the seal 102 and a lower metal end cap 204 disposed at the bottom face of the seal 102. The upper and lower metal end caps 202 and 204 span the upper and lower faces of the seal body 212, respectively. The upper and lower metal end caps 202 and 204 terminate on the inner and outer surfaces of the seal body 212. The terminal ends of the upper and lower metal end caps 202 and 204 on the inner seal surface include upper and lower protrusions or nibs 224 and 226, respectively.

When the seal 102 is installed in application, pressure is applied to the seal in the axial direction to energize the seal in a desired location, such as a seal envelope or gland. The pressure applied to the seal causes the upper and lower metal end cap protrusions or nibs 224 and 226 to deform into the base portion 208 of the seal body 212, squeezing the elastomeric protrusion. The upper and lower metal end cap protrusions 224 and 226 facilitate smoother, lower friction insertion into a desired location, preventing the elastomer from wearing during insertion. Traditional metal end cap seals without the upper and lower metal end cap protrusions 224 and 226 do not achieve the low friction installation and reduced wear taught in the presently claimed seal.

As will be appreciated, the cross-sectional geometry of the base portion 208 and the insert portion 210 may be varied to accommodate specific applications.

Figure 4B:
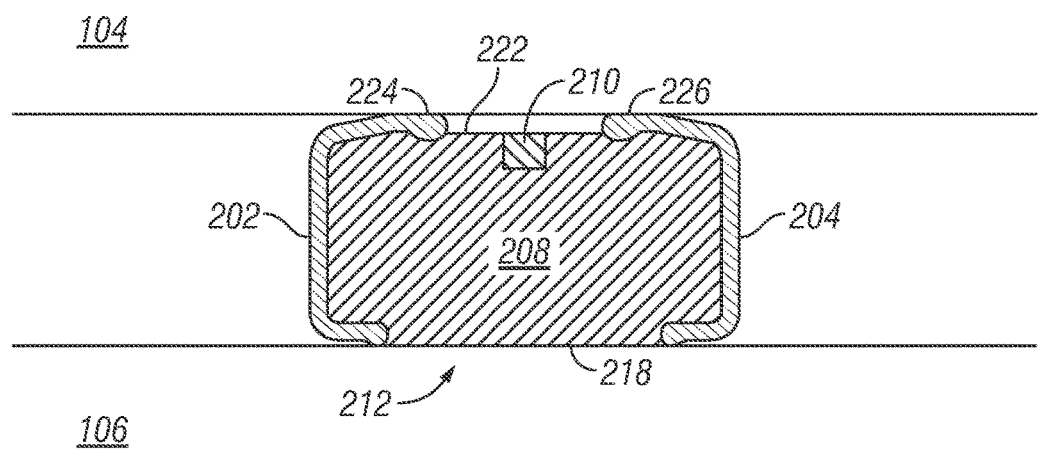
FIG. 4B is a cross-sectional profile view of a metal end cap seal in a compressed state.

FIG. 4B illustrates a cross-section of a profile view of the embodiment of the seal illustrated in FIGS. 2 and 3 in a compressed state. The seal is energized by being compressed between sealing surfaces 104 and 106. During compression, the lower and upper metal end caps 204 and 206 experience axial loads which push the seal into sealing position. The seal further experiences a radial load that compresses the seal into contact with the sealing surfaces 104 and 106.

Figure 5A:
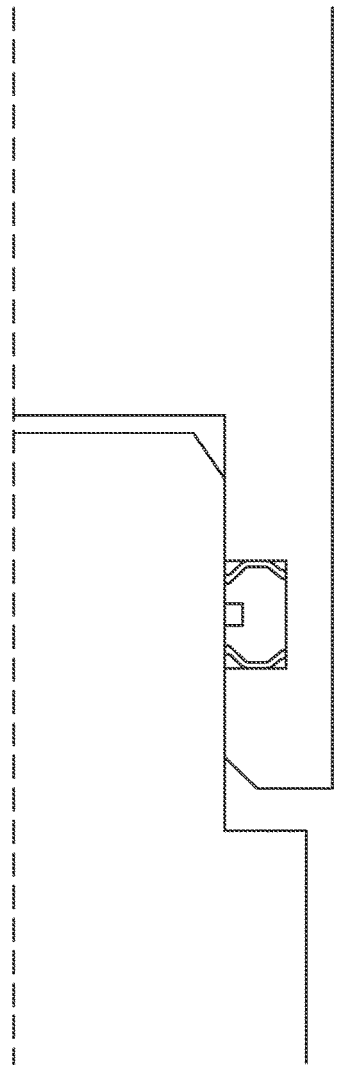
FIG. 5A is a cross-sectional elevation view of a metal end cap seal recessed in an outer body.
Figure 5B:
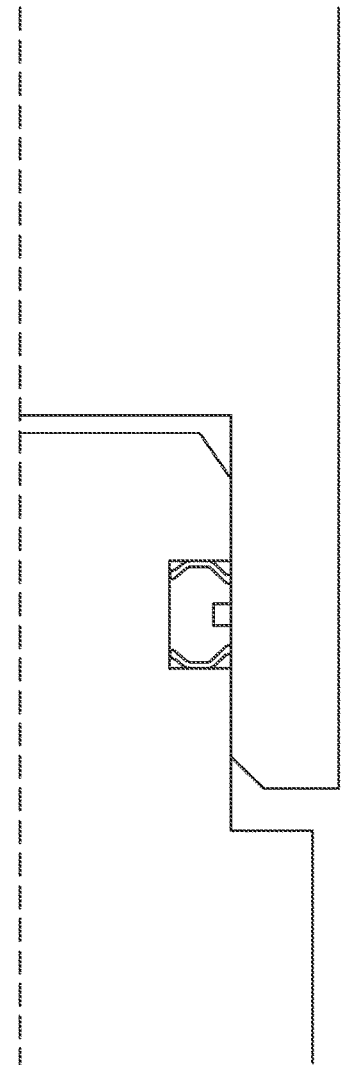
FIG. 5B is a cross-sectional elevation view of a metal end cap seal recessed in an inner body.

Turning now to FIGS. 5A and 5B, FIG. 5A illustrates a cross-sectional elevation view of a metal end cap seal recessed in an outer body and FIG. 5B is a cross-sectional elevation view of a metal end cap seal recessed in an inner body. Accordingly, the metal end cap seal can be positioned in either an inner body or an outer body of a system to be sealed.

The above discussed embodiments of the seal 102 may include any combination of elastomers and cross-sections conducive to providing a fluid seal. For example, each portion may include an elastomer having a different hardness, stiffness or glass transition temperature. Further, embodiments may include combinations of the embodied cross-sections.

Although the present invention has been described with respect to specific details, it is not intended that such details should be regarded as limitations on the scope of the invention, except to the extent that they are included in the accompanying claims.

What is claimed is:

1. A seal comprising:
   a base comprising an inner radial surface, an outer surface, an upper surface, and a lower surface;
   an upper metal end cap disposed on the upper surface of the base, the upper metal end cap comprising a protrusion of increased thickness disposed on a terminal end on the inner radial surface side of the upper metal end cap with the protrusion raised from the upper surface of the base; and
   a lower metal end cap disposed on the lower surface of the base, the lower metal end cap comprising a protrusion of increased thickness disposed on a terminal end on the inner radial surface side of the lower metal end cap with the protrusion raised from the lower surface of the base.

2. The seal of claim 1, further comprising an insert disposed along the inner radial surface of the base.

3. The seal of claim 2, wherein the insert is molded into the base.

4. The seal of claim 3, wherein the base and insert comprise material properties that are different from one another.

5. The seal of claim 4, wherein the material properties include one or more selected from hardness, stiffness, and glass transition temperature.

6. The seal of claim 2, wherein the insert comprises a dual durometer material.

7. The seal of claim 1, wherein the protrusions extend radially inward from the inner radial surface of the base.

8. The seal of claim 7, wherein the protrusions each comprise a chamfered edge.

9. The seal of claim 8, wherein the insert is disposed between the protrusions.

10. The seal of claim 1, wherein the lower and upper metal end caps comprise one or more materials selected from nickel based alloys, copper alloys which are beryllium free, and copper beryllium alloys.

11. A sealing system comprising:
    an inner body;
    an outer body; and
    a seal for sealing against the inner body and outer body, the seal comprising:
    a base comprising an inner radial surface, an outer surface, an upper surface, and a lower surface;
    an upper metal end cap disposed on the upper surface of the base, the upper metal end cap comprising a protrusion of increased thickness disposed on a terminal end on the inner radial surface side of the upper metal end cap with the protrusion raised from the upper surface of the base; and
    a lower metal end cap disposed on the lower surface of the base, the lower metal end cap comprising a protrusion of increased thickness disposed on a terminal end on the inner radial surface side of the lower metal end cap with the protrusion raised from the lower surface of the base.

12. The sealing system of claim 11, further comprising an insert disposed along the inner radial surface of the base.

13. The sealing system of claim 12, wherein the insert is molded into the base.

14. The sealing system of claim 13, wherein the base and insert comprise material properties that are different from one another.

15. The sealing system of claim 14, wherein the material properties include one or more selected from hardness, stiffness or glass transition temperature.

16. The sealing system of claim 15, wherein the insert portion is a dual durometer material.

17. The sealing system of claim 11, wherein the protrusions extend radially inward from the inner radial surface of the base.

18. The sealing system of claim 17, wherein the protrusions each comprise a chamfered edge.

19. The sealing system of claim 11, wherein the lower and upper metal end caps comprise one or more materials selected from nickel based alloys, copper alloys which are beryllium free, and copper beryllium alloys.

20. The sealing system of claim 11, wherein the inner body is selected from one of a production tree, a casing hanger, a casing head, a casing string, a tubing hanger, a tubing head, a tubing string, a running tool, a blowout preventer, a valve, and a flange.

21. The sealing system of claim 11, wherein the outer body is selected from one of a production tree, a casing hanger, a casing head, a casing string, a tubing hanger, a tubing head, a tubing string, a running tool, a blowout preventer, a valve, and a flange.

* * * * *